US010508628B2

(12) United States Patent
Dionne et al.

(10) Patent No.: US 10,508,628 B2
(45) Date of Patent: Dec. 17, 2019

(54) AUXILIARY POWER UNIT INLET ASSEMBLY WITH PARTICLE SEPARATOR

(71) Applicant: PRATT & WHITNEY CANADA CORP., Longueuil (CA)

(72) Inventors: Luc Dionne, Candiac (CA); Bruno Villeneuve, Boucherville (CA); Maxime Courtois, Longueuil (CA); Behzad Hagshenas, San Diego, CA (US); Andre Julien, Ste-Julie (CA)

(73) Assignee: Pratt & Whitney Canada Corp., Longueuil, Quebec (CA)

(*) Notice: Subject to any disclaimer, the term of this patent is extended or adjusted under 35 U.S.C. 154(b) by 190 days.

(21) Appl. No.: 15/294,285

(22) Filed: Oct. 14, 2016

(65) Prior Publication Data
US 2018/0106225 A1    Apr. 19, 2018

(51) Int. Cl.
*B01D 45/08* (2006.01)
*B01D 45/02* (2006.01)
(Continued)

(52) U.S. Cl.
CPC ....... *F02M 35/10262* (2013.01); *B64D 33/02* (2013.01); *F02B 53/14* (2013.01);
(Continued)

(58) Field of Classification Search
CPC ........ B01D 45/08; B01D 45/02; B01D 46/42; F02C 3/073; F02C 7/05; F02B 53/14;
(Continued)

(56) References Cited

U.S. PATENT DOCUMENTS 4,158,449 A * 6/1979 Sun ................... B01D 46/10
                                                244/136
4,268,284 A * 5/1981 Kent ................. B01D 45/08
                                                165/170
(Continued)

FOREIGN PATENT DOCUMENTS

EP    2065305    6/2009
EP    2743178    6/2014
(Continued)

*Primary Examiner* — Minh Chau T Pham
(74) *Attorney, Agent, or Firm* — Norton Rose Fulbright Canada L.L.P.

(57) ABSTRACT

An inlet assembly for an auxiliary power unit for an aircraft, including a particle separator and a plenum having first and second inlets. A first duct configured to deliver air to an engine of the auxiliary power unit is in fluid communication with an outlet of the plenum. A second duct configured to deliver air to a compartment containing the auxiliary power unit is in fluid communication with the outlet of the plenum. The assembly is selectively configurable between a first configuration where the plenum is in fluid communication with the environment of the aircraft through the second inlet and through the particle separator, and a second configuration where the plenum is in fluid communication with the environment of the aircraft through the first inlet independently of the particle separator. An auxiliary power unit assembly and a method of feeding air to an auxiliary power unit assembly are also discussed.

19 Claims, 8 Drawing Sheets

(51) Int. Cl.
  *B01D 46/42* (2006.01)
  *F02C 3/073* (2006.01)
  *F02C 7/05* (2006.01)
  *F02B 53/14* (2006.01)
  *B64D 33/02* (2006.01)
  *F02M 35/10* (2006.01)
  *F02M 35/024* (2006.01)
  *F02B 53/00* (2006.01)

(52) U.S. Cl.
  CPC .... *F02M 35/024* (2013.01); *F02M 35/10203* (2013.01); *B64D 2033/0213* (2013.01); *B64D 2033/0233* (2013.01); *B64D 2033/0246* (2013.01); *F02B 2053/005* (2013.01); *Y02T 10/146* (2013.01); *Y02T 10/17* (2013.01)

(58) Field of Classification Search
  CPC .............. F02B 2053/005; B64D 33/02; B64D 2033/0233; B64D 2033/0213; F02M 35/10262; F02M 35/10203
  USPC ................. 55/306, 314, 309, 310, 312, 313, 55/428–430, 432, 466; 60/39.092, 772, 60/264; 415/121.2
  See application file for complete search history.

(56) References Cited

U.S. PATENT DOCUMENTS

| | | | |
|---|---|---|---|
| 4,304,094 A | 12/1981 | Amelio | |
| 4,561,245 A | 12/1985 | Ball | |
| 4,767,425 A | 8/1988 | Camplin et al. | |
| 4,798,047 A | 1/1989 | Geary | |
| 4,972,672 A | 11/1990 | Sanderson et al. | |
| 5,222,693 A | 6/1993 | Slutzkin et al. | |
| 6,264,137 B1 | 7/2001 | Sheoran | |
| 6,398,837 B1 | 6/2002 | Alvin et al. | |
| 6,651,929 B2 | 11/2003 | Dionne | |
| 7,678,165 B2 | 3/2010 | Tingle et al. | |
| 7,770,375 B2 * | 8/2010 | Alvanos | F01D 25/32 415/121.2 |
| 8,015,787 B2 * | 9/2011 | Snyder | B01D 45/02 244/53 B |
| 8,234,874 B2 * | 8/2012 | Upadhyay | B01D 46/42 55/314 |
| 8,685,126 B2 * | 4/2014 | Descubes | F02C 3/073 244/23 R |
| 8,733,694 B2 | 5/2014 | Francisco et al. | |
| 9,273,647 B2 | 3/2016 | Shieh | |
| 9,863,317 B2 | 1/2018 | Santini et al. | |
| 2003/0024233 A1 * | 2/2003 | Snyder | B01D 45/08 60/39.092 |
| 2007/0294984 A1 | 12/2007 | Chillar et al. | |
| 2008/0236133 A1 * | 10/2008 | Bart | F02C 7/05 60/39.092 |
| 2009/0007528 A1 | 1/2009 | Wilson | |
| 2009/0261208 A1 * | 10/2009 | Belyew | B01D 46/10 244/53 B |
| 2011/0315015 A1 | 12/2011 | Jarrier et al. | |
| 2012/0312023 A1 | 12/2012 | Ertz et al. | |
| 2013/0051994 A1 | 2/2013 | Lafontaine et al. | |
| 2014/0182306 A1 | 7/2014 | Castagnera | |
| 2015/0101344 A1 * | 4/2015 | Jarrier | F02C 7/05 60/796 |
| 2015/0114229 A1 | 4/2015 | Rout et al. | |
| 2015/0240720 A1 | 8/2015 | Brunner | |
| 2015/0344141 A1 * | 12/2015 | Brand | B64D 33/02 95/273 |
| 2016/0061158 A1 | 3/2016 | Taylor | |
| 2016/0177724 A1 | 6/2016 | Sheoran et al. | |
| 2017/0128876 A1 | 5/2017 | Shibuya et al. | |

FOREIGN PATENT DOCUMENTS

| | | |
|---|---|---|
| EP | 3034408 | 6/2016 |
| EP | 3059420 | 8/2016 |
| EP | 3281876 | 2/2018 |
| WO | 2015054334 | 4/2015 |

* cited by examiner

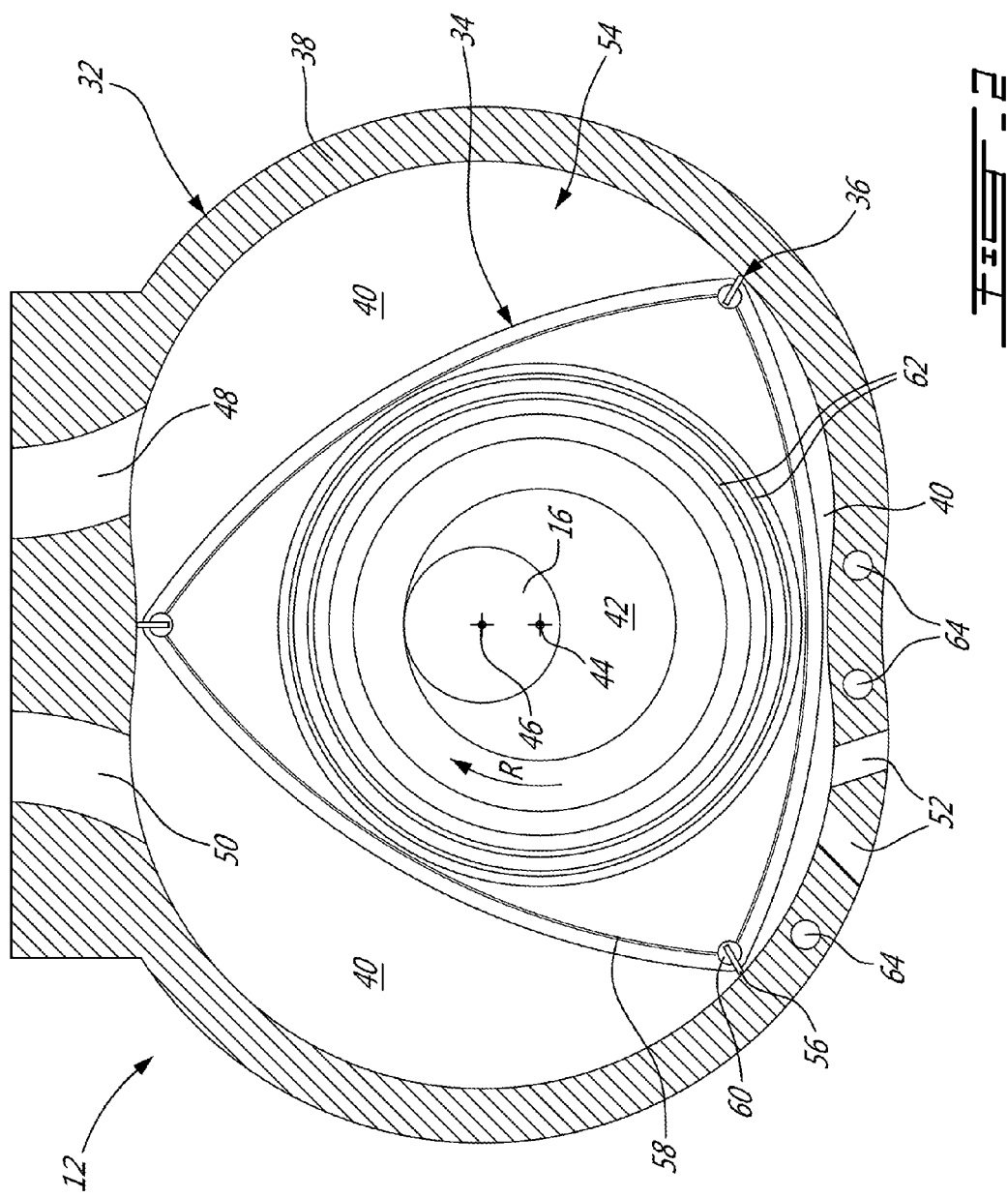

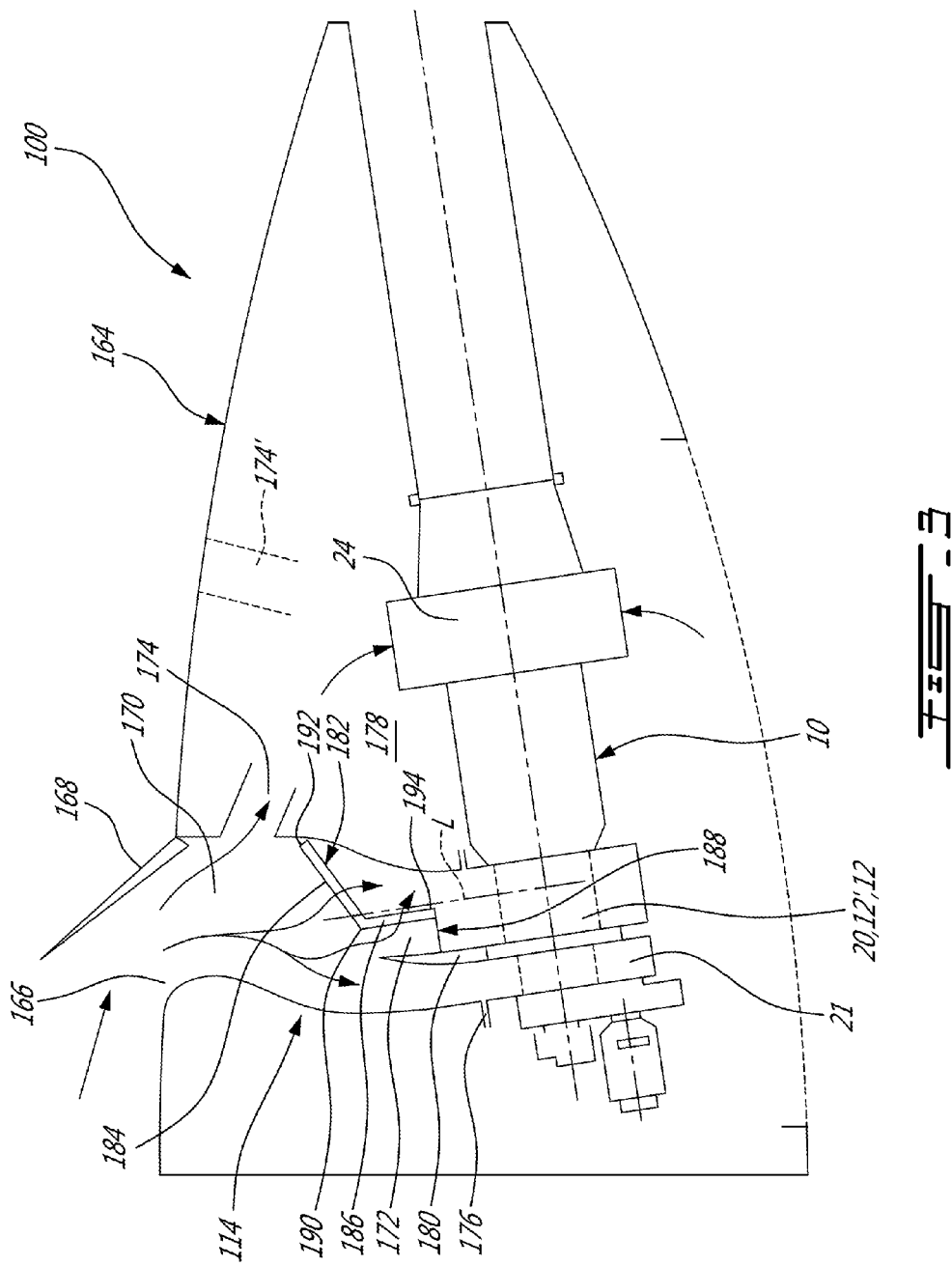

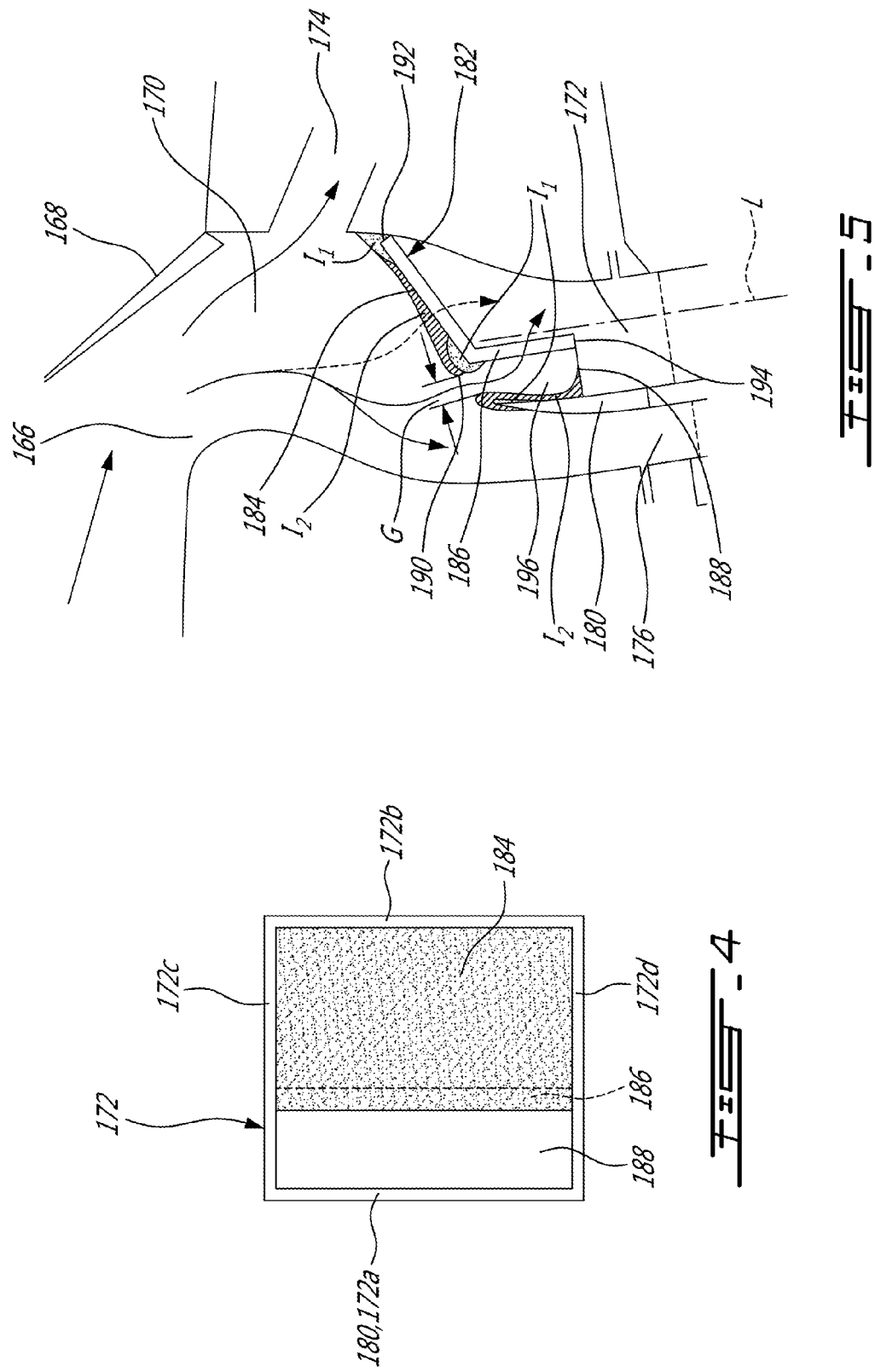

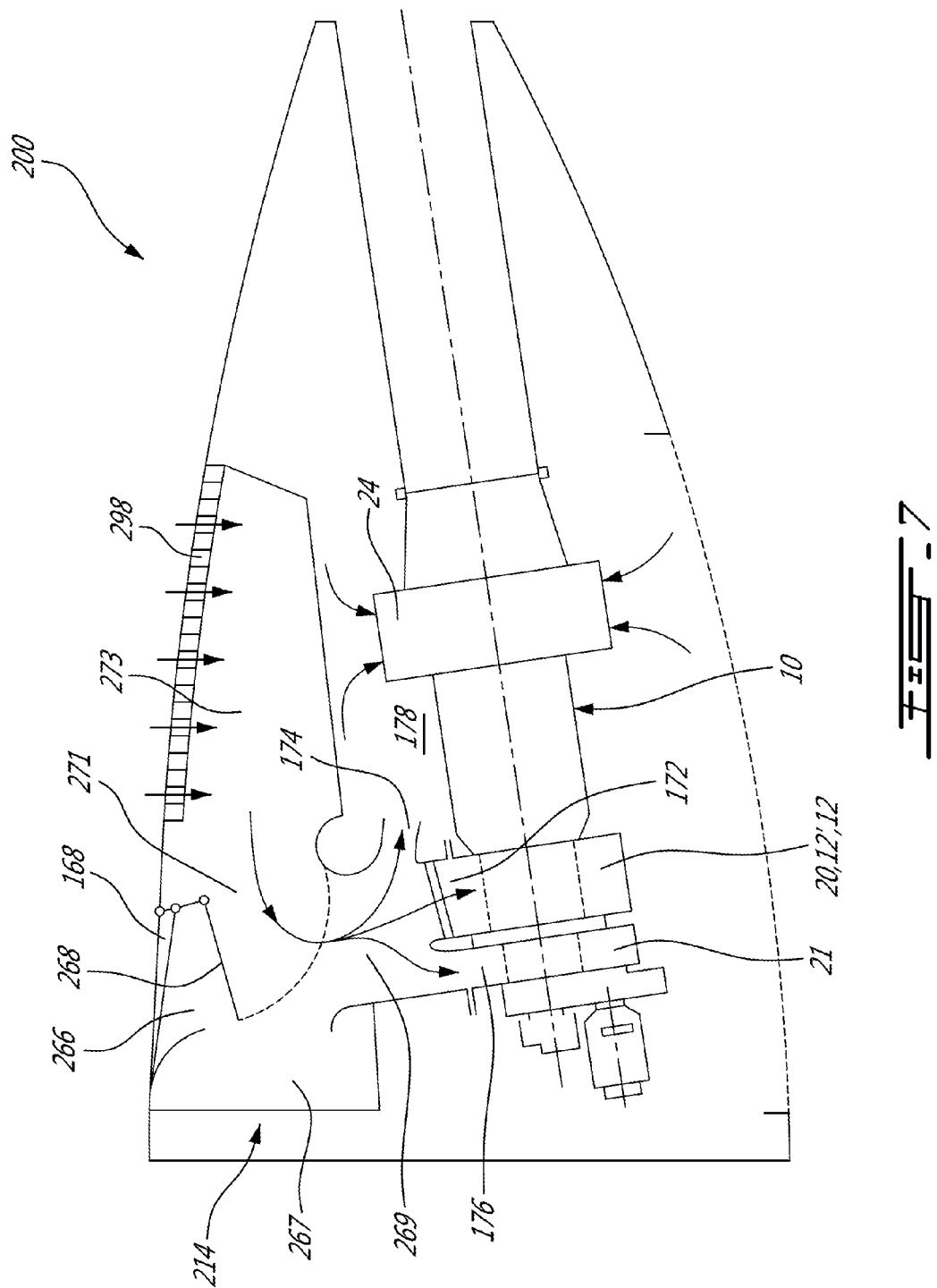

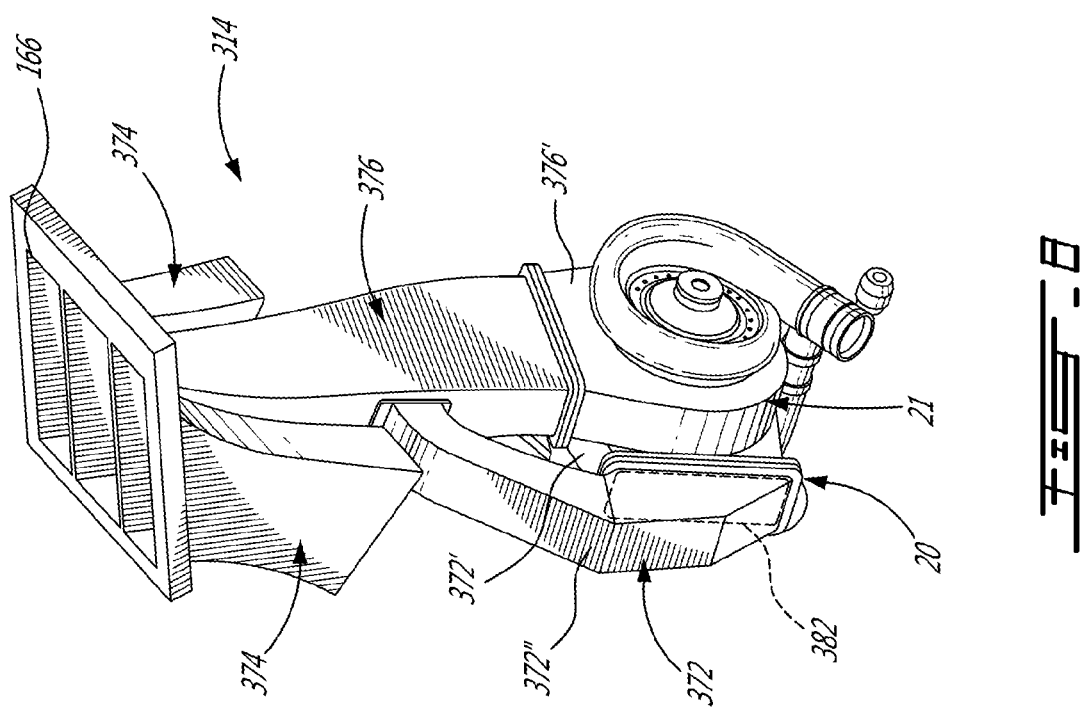

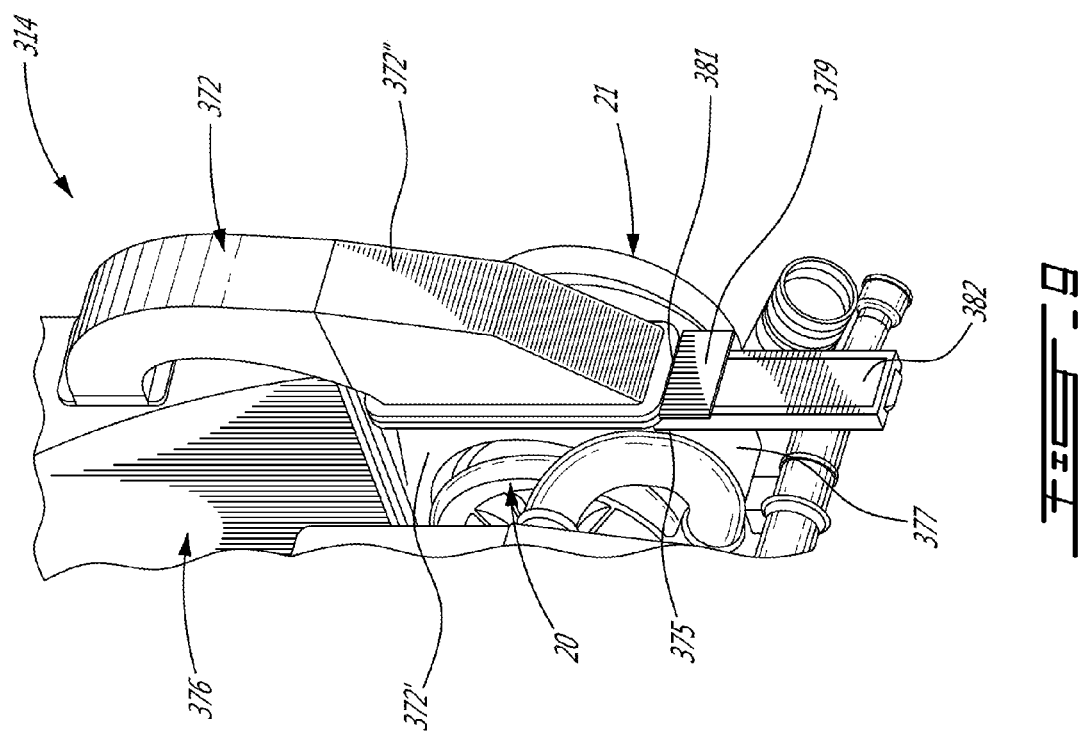

AUXILIARY POWER UNIT INLET ASSEMBLY WITH PARTICLE SEPARATOR

TECHNICAL FIELD

The application relates generally to auxiliary power unit assemblies and, more particularly, to such assemblies including one or more internal combustion engine.

BACKGROUND OF THE ART

Aircraft auxiliary power unit assemblies are typically used during ground operation, and as such may be exposed to contaminants, such as soil particles and sand. Low temperature operation may also expose the auxiliary power unit assembly to icing conditions. Contaminants and ice formation may be detrimental to the operation of the auxiliary power unit assembly, particularly when such assemblies include internal combustion engine(s).

Filters may be provided upstream of the internal combustion engine(s); however, such filters may be susceptible to clogging by ice and/or particles, and/or may be hard to access for replacement or repair.

SUMMARY

In one aspect, there is provided a movable inlet assembly for an auxiliary power unit for an aircraft, the assembly comprising: a first inlet defined on an exterior skin of the aircraft, the first inlet fluidly communicating between an environment of the aircraft and an engine of the auxiliary power unit via a particle separator when the inlet assembly is in a first configuration; a second inlet defined on an exterior skin of the aircraft, the second inlet fluidly communicating between the environment of the aircraft and the engine independently of the particle separator when the inlet assembly is in a second configuration; a member selectively positionable to substantially block communication between the second inlet and the engine when the inlet assembly is in the first configuration.

In another aspect, there is provided an auxiliary power unit assembly for an aircraft, comprising: an internal combustion engine received in a compartment; a particle separator configured to remove particles from a flow; an inlet assembly including: a first inlet fluidly communicating between an environment of the aircraft and the internal combustion engine via a particle separator when the inlet assembly is in a first configuration and fluidly communicating between the environment and the compartment via the particle separator when the inlet assembly is in the first configuration; a second inlet fluidly communicating between the environment and the engine independently of the particle separator when the inlet assembly is in a second configuration and fluidly communicating between the environment and the compartment when the inlet assembly is in the second configuration; a member selectively positionable to substantially block communication between the second inlet and the engine when the inlet assembly is in the first configuration; wherein the first and second inlets communicate with the internal combustion engine through a filter and with the compartment independently of the filter.

In a further aspect, there is provided a method of feeding air to an auxiliary power unit assembly of an aircraft, the method comprising: in a contaminated environment, circulating air from the environment of the aircraft into a plenum through a particle separator to remove particles from the air; in a clean environment, circulating air from the environment of the aircraft into the plenum at least in part without circulating through the particle separator; and in the contaminated and clean environments, circulating a first portion of the air from the plenum to an inlet of an internal combustion engine of the auxiliary power unit assembly through a filter and a second portion of the air from the plenum to a compartment containing the internal combustion engine independently of the filter.

DESCRIPTION OF THE DRAWINGS

Reference is now made to the accompanying figures in which:

FIG. 2 is a schematic cross-sectional view of a rotary engine which can be used in the engine assembly of FIG. 1;

FIG. 3 is a schematic side cross-sectional view of an auxiliary power unit assembly in accordance with a particular embodiment, which may include an engine assembly such as shown in FIG. 1;

FIG. 4 is a schematic top cross-sectional view of a filter of the assembly of FIG. 3;

FIG. 5 is a schematic side cross-sectional view of part of the assembly of FIG. 3, showing an example of icing conditions;

FIG. 7 is a schematic side cross-sectional view of the assembly of FIG. 6 in a second configuration;

FIG. 8 is a schematic tridimensional view of an inlet assembly in accordance with another particular embodiment, which may be used with an engine assembly such as shown in FIG. 1; and FIG. 9 is another schematic tridimensional view of the inlet assembly of FIG. 8.

DETAILED DESCRIPTION

Figure 1:
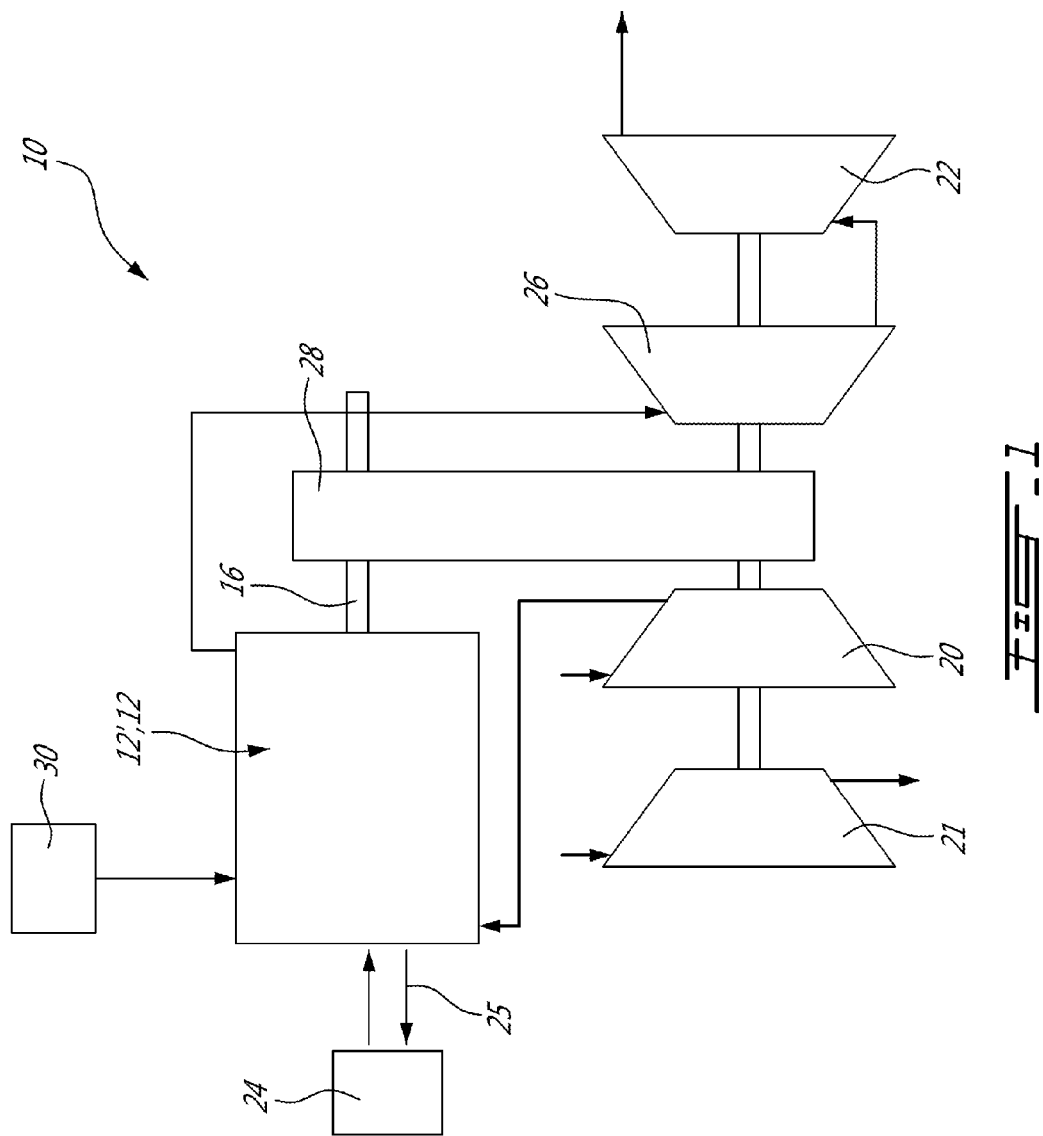
FIG. 1 is a diagram of an engine assembly in accordance with a particular embodiment.

Referring to FIG. 1, a compound engine assembly 10 which in a particular embodiment is used as an auxiliary power unit (APU) is generally shown. The engine assembly 10 generally includes a supercharger compressor 20 compressing the air to feed an engine core 12' including one or more internal combustion engines 12, and a load compressor 21 providing bleed air for the aircraft. Alternately, the supercharger compressor 20 may also act as the load compressor, i.e. both functions may be performed by a same compressor.

The exhaust from the engine core 12' is fed to one or more turbines 26, 22 of a compounding turbine section. One or more of the turbines 26, 22 is/are configured to compound power with the engine core 12'; in the embodiment shown, the turbine and engine shafts are coupled through a transmission provided by a gearbox 28. The compressor(s) 20, 21 are driveable by the engine(s) 12 either directly or indirectly, i.e. the compressor(s) 20, 21 may be driven by the turbines 26, 22 and/or the engine core 12'. In the embodiment shown, the compressors 20, 21 are driven by the turbines 26, 22, for example by being coupled to the same shaft or being engaged to the turbine shaft through a transmission provided in the gearbox 28. In another particular embodiment, the shaft(s) of the compressor(s) 20, 21 is/are engaged to the output shaft 16 of the engine core 12', either directly or through a transmission.

In a particular embodiment, the internal combustion engine(s) 12 are rotary intermittent internal combustion engines, for example Wankel engines; it is however understood that other types of intermittent internal combustion engines or other types of internal combustion engines may alternately be used.

Referring to FIG. 2, an example of a Wankel engine which may be used in the engine core 12' is shown. It is understood that the configuration of the engine(s) 12, e.g. placement of ports, number and placement of seals, etc., may vary from that of the embodiment shown.

The engine 12 comprises a housing 32 defining a rotor cavity having a profile defining two lobes, which is preferably an epitrochoid. A rotor 34 is received within the rotor cavity. The rotor defines three circumferentially-spaced apex portions 36, and a generally triangular profile with outwardly arched sides. The apex portions 36 are in sealing engagement with the inner surface of a peripheral wall 38 of the housing 32 to form and separate three working chambers 40 of variable volume between the rotor 34 and the housing 32. The peripheral wall 38 extends between two axially spaced apart end walls 54 to enclose the rotor cavity.

The rotor 34 is engaged to an eccentric portion 42 of an output shaft 16 to perform orbital revolutions within the rotor cavity. The output shaft 16 performs three rotations for each orbital revolution of the rotor 34. The geometrical axis 44 of the rotor 34 is offset from and parallel to the axis 46 of the housing 32. During each rotation of the rotor 34, each chamber 40 varies in volume and moves around the rotor cavity to undergo the four phases of intake, compression, expansion and exhaust.

An intake port 48 is provided through the peripheral wall 38 for admitting compressed air into one of the working chambers 40. An exhaust port 50 is also provided through the peripheral wall 38 for discharge of the exhaust gases from the working chambers 40. Passages 52 for a spark plug, glow plug or other ignition mechanism, as well as for one or more fuel injectors of a fuel injection system (not shown in FIG. 1) are also provided through the peripheral wall 38. Alternately, the intake port 48, the exhaust port 50 and/or the passages 52 may be provided through the end or side wall 54 of the housing. A subchamber (not shown) may be provided in communication with the chambers 40, for pilot or pre injection of fuel for combustion.

For efficient operation the working chambers 40 are sealed by spring-loaded peripheral or apex seals 56 extending from the rotor 34 to engage the inner surface of the peripheral wall 38, and spring-loaded face or gas seals 58 and end or corner seals 60 extending from the rotor 34 to engage the inner surface of the end walls 54. The rotor 34 also includes at least one spring-loaded oil seal ring 62 biased against the inner surface of the end wall 54 around the bearing for the rotor 34 on the shaft eccentric portion 42.

The fuel injector(s) of the engine 12, which in a particular embodiment are common rail fuel injectors, communicate with a source 30 (see FIG. 1) of Heavy fuel (e.g. diesel, kerosene (jet fuel), equivalent biofuel), and deliver the heavy fuel into the engine 12 such that the combustion chamber is stratified with a rich fuel-air mixture near the ignition source and a leaner mixture elsewhere.

Referring back to FIG. 1, the assembly 10 includes one or more heat exchanger(s) 24, for example for receiving a coolant (e.g., liquid coolant) of the engine(s) 12. In a particular embodiment, the heat exchanger 24 for the engine coolant and the coolant circulation system 25 are distinct from any fuel and lubricating system of the engine(s) 12 and of the auxiliary power unit assembly as a whole. The dedicated engine coolant may be for example water, or water mixed with anti-freeze liquid(s) such as ethylene glycol. Additional heat exchangers 24 may be used, for example, to cool the oil or other lubricant of the engine assembly 10 and to cool the compressed air between the supercharger compressor 20 and the internal combustion engine(s) 12.

In a particular embodiment, an auxiliary power unit assembly includes an engine assembly 10 such as described above, and a movable inlet assembly which may have various configurations. Referring to FIG. 3, an inlet assembly 114 in accordance with a particular embodiment is shown, which is particularly, although not exclusively, suitable for use in contaminated environments, with ambient air containing dust particles or supercooled water droplets. Although the auxiliary power unit assembly 100 is shown as including the engine assembly 10 of FIGS. 1-2, it is understood that the engine assembly can alternately have any other suitable configuration.

The engine assembly 10 and inlet assembly 114 are received in an enclosure 164, for example defined by a compartment of the aircraft. The walls of the enclosure 164 define a main inlet opening 166 defined on an exterior skin of the aircraft, which is selectively closable and openable by a main inlet door 168; in the embodiment shown, the main inlet door 168 is pivotable and forward-facing. A relatively short main inlet duct 170 extends from the main inlet opening 166. Three ducts extend from the main inlet duct 170: an engine duct 172, a compartment duct 174, and a bleed duct 176. The engine duct 172, compartment duct 174 and bleed duct 176 are each configured to be in fluid communication with the environment of the aircraft (i.e., receive outside air) when the main inlet door 168 is open, through the main inlet opening 166 and main inlet duct 170. Alternately, the compartment duct 174' (as shown in dotted lines in FIG. 3) may communicate with the environment of the aircraft through another inlet opening separate from the main inlet opening 166, which can for example have a fixed opening or be have an opening with a variable area, for example as defined by a plurality of movable louvers which can open or close during flight.

The engine duct 172 is in fluid communication with the inlet of the internal combustion engine(s) 12 through the supercharger compressor 20, i.e. the engine duct 172 is in fluid communication with the inlet of the compressor 20. It is however understood that with an engine assembly having a different configuration, the engine duct 172 may communicate directly with the internal combustion engine(s) 12.

The compartment duct 174 is in fluid communication with a compartment 178 of the enclosure 164 containing the engine assembly 10, such as to provide cooling air to the engine assembly 10. In the embodiment shown, the heat exchanger(s) 24 is/are located in the compartment 178 with air passages of the heat exchanger(s) 24 being in fluid communication with the compartment 178; the cooling air discharged by the compartment duct 174 can be used partially or entirely by the heat exchanger(s) 24. In a particular embodiment, one or more fan(s) (not shown) are driven by the internal combustion engine(s) 12 to drive the air from the compartment 178 through the heat exchanger(s) 24 and back to the environment through an exhaust duct of the engine assembly 10.

The bleed duct 176 is in fluid communication with the inlet of the load compressor 21, which provides compressed air for the aircraft. In the embodiment shown, the engine and bleed ducts 172, 176 extend side-by-side and are separated by a common wall 180 configured as a flow splitter having a leading edge defined at the junction of the two ducts 172, 176. In a particular embodiment, the engine and bleed ducts 172, 176 are relatively sized and positioned so that approximately 30% of the total flow to the engine and bleed ducts 172, 176 is circulated into the engine duct 172. Other sizes and flow proportions are also possible.

A filter 182 is received in and extends across the engine duct 172, so that all the air circulating into the engine duct 172 circulates through the filter 182. The filter 182 has a zigzag shape formed by first and second filter portions 184, 186 configured to filter the air flow (e.g., permeable to air but having a pore size selected to prevent particles greater than a predetermined size from passing therethrough), and by a collection member 188 at least impermeable to water.

The first filter portion 184 extends across only part of the span of the engine duct 172 and defines a transverse edge 190 extending across the engine duct 172. The first filter portion 184 is positioned to receive a majority of the flow coming into the engine duct 172, and accordingly extends transversely to the flow. In the embodiment shown, the first filter portion 184 is angled with respect to (i.e. extends at a non-zero angle from) the longitudinal direction L of the engine duct and is also angled with respect to (i.e. extends at a non-zero angle from) the perpendicular to that longitudinal direction L. The first filter portion 184 is angled so that the transverse edge 190 is located downstream of the opposed end 192 of the first filter portion 184 adjacent the duct wall.

The second filter portion 186 extends downstream from the transverse edge 190 of the first filter portion 184, and accordingly has an end 194 located downstream of the transverse edge 190. The two filter portions 184, 186 are angled with respect to each other, i.e., non-parallel; a corner defining a leading edge is formed at the transverse edge 190. In the embodiment shown, the second filter portion 186 extends along (i.e., parallel to, or close to a parallel to) the longitudinal direction L of the engine duct 172; in use, the second filter portion 186 may extend vertically. Accordingly, the second filter portion 186 extends along or substantially along the direction of the flow in the engine duct 172 upstream of the filter 182, and the flow needs to be redirected or turned before passing through the second filter portion 186.

The collection member 188 extends between the downstream end 194 of the second filter portion 186 and the adjacent wall 180 of the engine duct 172 defining the splitter between the engine duct 172 and the bleed duct 176, i.e. it extends across the remainder of the span of the engine duct 172. The collection member 188 is non-parallel to the second filter portion 186. In the embodiment shown, the collection member 188 extends perpendicularly, or approximately perpendicularly, to the longitudinal direction L of the engine duct 172, and accordingly is non-parallel to the first filter portion 184. In a particular embodiment, the collection member 188 includes a solid plate impermeable to air.

In a particular embodiment and as can be seen in FIG. 4, the engine duct 172 has a rectangular cross-section, formed by two pairs of opposed walls 172a, b and 172c, d. The first filter portion 184 is adjacent, for example connected to, one wall 172b of the first pair, while the collection member 188 is adjacent, for example connected to, the other wall 172a of the first pair (e.g. splitter 180). The second filter portion 186 extends spaced from the walls 172a, b of the first pair. The two filter portions 184, 186 and the collection member 188 all extend adjacent, for example connected to, the walls 172c, d of the second pair. The first filter portion 184 has a greater cross-sectional area than the collection member 188. Other configurations are also possible.

The first filter portion 184 is positioned with respect to the main inlet opening 166 so as to extend across a direct path from the main inlet opening 166 to the engine duct 172, so that a majority of the flow into the main inlet duct 170 into the engine duct 172 is directed through the first filter portion 184. By contrast, the second filter portion 186 is positioned so that the flow has to turn to pass therethrough. In a particular embodiment, the filter 182 is accordingly shaped and oriented to provide enough frontal area to avoid high pressure losses and to prevent complete blockage under icing conditions. The relative locations of the transverse edge 190 and the leading edge of the splitter 180 are selected so that the ice accretion at these locations prevents complete airflow blockage on the second filter portion by taking advantage of the natural flow separation, as detailed below.

In use and referring to FIG. 5, the flow containing air and supercooled water droplets is circulated to the engine duct 172 and in majority through the first filter portion 184, since the first filter portion 184 extends across the direct route for the flow coming from the main inlet duct 170. However, as the supercooled water droplets are retained on the first filter portion 184, an ice layer is progressively formed on the first filter portion 184 ; $I_1$, $I_2$ illustrate and example of ice build-up over time, with $I_2$ representing additional build-up over $I_1$. As the first filter portion 184 is covering with ice, it becomes less permeable to air, and can become completely obstructed (as shown by $I_2$), causing recirculation of the flow over the first filter portion 184. The iced first filter portion 184 diverts the flow along the iced surface, passed the transverse edge 190 and toward the wall of the engine duct (which in the embodiment shown is formed by the splitter 180) and the space 196 defined between that wall 180 and the transverse edge 190.

The wall 180 of the engine duct 172 and the adjacent collection member 188 abruptly change the direction of the air in the flow to direct it toward the second filter portion 186. Because of their inertia, the supercooled water droplets are not able to follow the change of direction of the air, and impact the wall 180 of the engine duct 172 and/or the collection member 188. The water is thus retained by the wall 180 and/or the collection member 188, for example in the form of an ice coating $I_1$, $I_2$. The air circulating through the second filter portion 186 is accordingly free or substantially free of the supercooled water droplets, allowing the second filter portion 186 to remain free or substantially free of ice, thus maintaining a flow through the filter 182 during icing conditions.

The distance between the transverse edge 190 and the wall/splitter 180 is selected so that under icing conditions, the remaining gap G between the ice formations is sized to provide a sufficient flow to the engine 12. In a particular embodiment, computational fluid dynamics (CFD) models are used to determine the relative position of the wall/splitter 180 and transverse edge 190, for example as a function of stagnation streamlines of the flow upstream of the filter 182.

Figure 6:
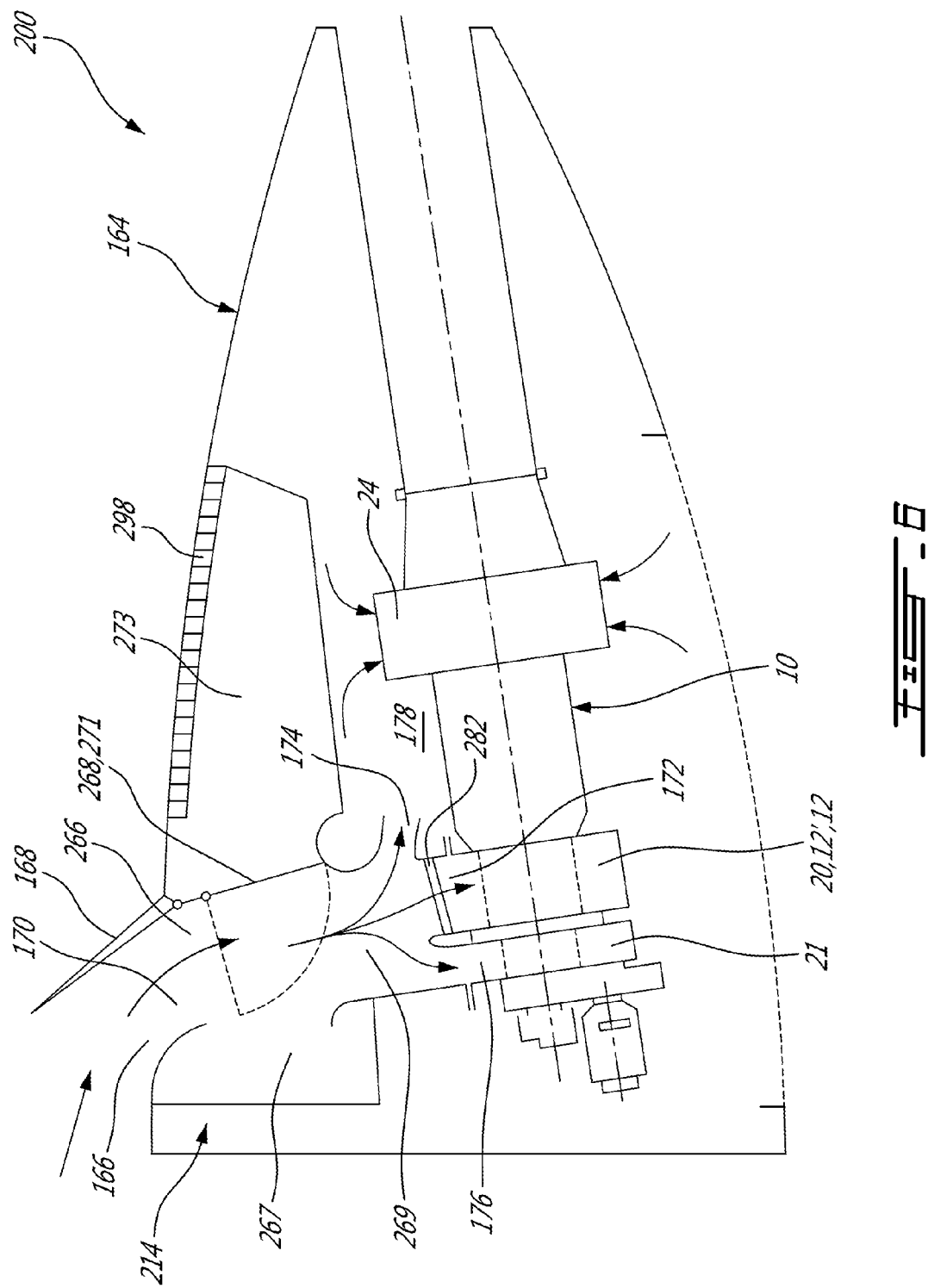
FIG. 6 is a schematic side cross-sectional view of an auxiliary power unit assembly in accordance with another particular embodiment, in a first configuration.

Referring to FIG. 6-7, an auxiliary power unit assembly 200 including an inlet assembly 214 in accordance with another particular embodiment is shown, which is particularly, although not exclusively, suitable for use in environments with particle contaminants, e.g., sand. Elements similar to that of the embodiment of FIGS. 3-5 are identified with the same reference numerals and will not be described further herein. Although the auxiliary power unit assembly 200 is shown as including the engine assembly 10 of FIGS. 1-2, it is understood that the engine assembly can have any other suitable configuration.

In this embodiment, the main inlet duct 170 extends from the main inlet opening 166 to a primary inlet 266 of a main plenum 267, which is accordingly in selective communication with the environment of the aircraft upon opening of the main inlet door 168. The engine duct 172, compartment duct 174 and bleed duct 176 are all connected to an outlet of the main plenum 267, for example by being in fluid communication with a common duct 269 extending from the main plenum 267. A filter 282 extends across the engine duct 172. This filter 282 may be a planar filter, as shown, or a filter having any other suitable configuration, including, but not limited to, the filter 182 of FIGS. 3-5.

The assembly 200 includes a particle separator 298 having an inlet defined on an exterior skin of the aircraft. The primary inlet 266 is in selective fluid communication with the environment independently from the particle separator 298, i.e. the flow path from the environment, through the primary inlet 266 and into the main plenum 267 does not pass through the particle separator 298. However, the main plenum 267 includes a secondary inlet 271 which is in selective fluid communication with the environment of the aircraft through the particle separator 290. In the embodiment shown, this selective fluid communication is provided through a secondary plenum 273 located aft of the main plenum 267 and communicating with an air outlet of the particle separator 298. The secondary plenum 273 has an outlet in selective communication with the secondary inlet 271 of the main plenum 267, for example through a pivotable member of secondary inlet door 268 pivotable to open or close the communication between the primary and secondary plenums 267, 273, as required.

The particle separator 298 can have any configuration suitable to remove particles from an air flow. In a particular embodiment, the particle separator 298 is configured to provide high efficiency separation of particle contaminants; for example, the particle separator 298 may be a panel including a plurality of vortex tubes (e.g., Centrisep® panel). Each vortex tube is configured with a vortex generator along its periphery and has an open center. The vortex generator generates a swirling motion in the contaminated air passing therethrough and the centrifugal force pushes the particles radially outward against the tube wall, thus creating an annular flow of particles around a central flow of clean air. Each vortex tube has a tubular outlet separating the particle flow from the clean air flow. The particle flow is directed to a collector (not shown) while the air flows out of the particle separator 298 into the secondary plenum 273.

It is understood that any other suitable configuration can be used for the particle separator 298, so long as it is able to sufficiently remove particle contaminants from the air flow while ensuring proper air flow is maintained.

Through movement of the main and secondary inlet doors 168, 268, the assembly can have a configuration suitable for use in a clean air environment (FIG. 6), for example for flight and uncontaminated ground operation, and a configuration suitable for use in an environment contaminated with particles (FIG. 7), for example for ground operation in a sand environment. In the clean configuration and as shown in FIG. 6, the main inlet door 168 is open and the primary inlet 266 of the main plenum 267 is in fluid communication with the environment, so that the air flows directly from the environment, through the main inlet opening 166, main inlet duct 170 and primary inlet 266, and into the main plenum 267. The secondary inlet door 268 is closed, to prevent the fluid communication between the particle separator 298 and the main plenum 267. In this configuration, the internal combustion engine 12, the compartment 178 and the load compressor 21 are in fluid communication with the environment through the primary inlet 266, independently of (i.e., without passing through) the particle separator 298.

In the contaminated configuration and as shown in FIG. 7, the main inlet door 168 is closed to prevent the fluid communication between the primary inlet 266 of the main plenum 267 and the environment. The secondary inlet door 268 is open, so that the air flows from the environment through the particle separator 298, where the particles are removed. The filtered air then flows through the secondary plenum 273 and into the main plenum 267. In this configuration the internal combustion engine 12, the compartment 178 and the load compressor 21 are in fluid communication with the environment through the particle separator 298 and secondary inlet 271.

In both configurations, the air circulates from the main plenum 267 through the common duct 269 and then to the engine duct 172, the compartment duct 174 and the bleed duct 176.

It is understood that the particular flow configuration shown is exemplary only and that any other suitable configuration allowing for the entire air flow to be circulated through the particle separator 298 in one configuration and at least part of the air flow to bypass the particle separator 298 in another configuration may alternately be used. For example, the particle separator 298 may be integrated into the main inlet door 168 and the secondary plenum 273 may be omitted.

The opening and closing of the doors 168, 268 may be commanded using any suitable system, for example the FADEC (full authority digital engine (or electronics) control) of the auxiliary power unit assembly 200. In a particular embodiment, the FADEC may command the position of the doors 168, 268 based on the weight on wheels (indicating ground or flight position) and the ambient temperature (for example for ambient temperatures higher than 40° F.).

In a particular embodiment, the assembly 200 is accordingly configurable to be used in two types of environment by changing only the positions of the two doors 168, 268, which may allow for a quick and easy reconfiguration of the assembly 200 as required.

Referring to FIG. 8-9, an inlet assembly in accordance with another particular embodiment is shown. The inlet assembly may be used in an auxiliary power unit assembly including the engine assembly of FIGS. 1-2, or an engine assembly having any other suitable configuration.

In this embodiment, the bleed duct 376 extends from the main inlet opening 166 to the load compressor 21, and the engine duct 372 is in fluid communication with the main inlet opening 166 by being connected to the bleed duct 376. Two other ducts 374 (FIG. 8) are shown as extending from the main inlet opening 166; one or both of these ducts 374 may be compartment ducts, as described above, and/or ducts to direct cooling air to specific portions of the nacelle.

Although not shown, the inlet assembly 314 may have two alternate configurations so that the air can selectively be circulated through a particle separator before reaching the ducts 372, 374, 376, as shown in FIGS. 6-7 and discussed above.

In this embodiment and referring to FIG. 9, the filter 382 received in and extending across the engine duct 372 is removable from the engine duct 372 through an opening 375 in a wall of the duct 372; in the embodiment shown, the filter 382 is slidable out of the opening 375, which is defined through a bottom wall 377 of the engine duct 372, so that the filter 382 is vertically and downwardly slidable out of the opening 375. In a particular embodiment, the engine duct 372 defines C-shaped channels engaging with side edges and a top edge of the filter 382; other suitable configurations may alternately be used.

The opening 375 is accessible from the exterior of the auxiliary power unit assembly containing the inlet assembly 314. In a particular embodiment, the opening 375 is positioned so as to be accessible through a nacelle door providing access to the compartment (e.g., fuselage tail cone bottom door), so as to facilitate replacement or repair of the filter 382.

The opening 375 can be selectively covered by a removable or movable (e.g. pivotable) door, which is retained in its closed position through any suitable type of attachment including, but not limited to, latches, clips, and bolts. In the embodiment shown, the opening 375 is closed by a door 379 (shown open in FIG. 9) including an integrated seal, biased toward the closed position through a hinge spring 381.

Although shown as being retained through a sliding engagement, it is understood that the filter 382 can alternately be removably retained through any other suitable type of configuration, including, but not limited to, clamped between complementary flanges of portions of the duct 372 coupled to each other by any suitable attachment allowing at least one of the portions to be easily removed (e.g., latches, spring clips, bolts), and engaged to the duct 372 through any suitable type of removable attachment (e.g., threads).

In the embodiment shown, the engine duct 372 includes a plenum 372' in which the inlet of the supercharger compressor 20 is received, and a C-shaped conduit 372" between the inlet of the plenum 372' and the bleed duct 376. The filter 382 is engaged to the plenum 372' adjacent its inlet, at the downstream end of the engine duct 372". In a particular embodiment, the C-shape of the conduit 372" acts as a particle separator, preventing at least some of the particles of the flow from being directed into the conduit 372" due to their inertia. The filter 382 prevents at least some (and in a particular embodiment, all) of the remaining particles from reaching the internal combustion engine(s) 12. The filter opening 375 located at the downstream end of the engine duct 372, underneath the duct 372, can be used upon removal of the filter 382 to extract debris accumulated in the engine duct 372.

The engine duct 372 and bleed duct 376 can be configured as separately formed elements detachably interconnected, or alternately, be permanently and/or integrally connected. In the embodiment shown, the bleed duct 376 also defines a plenum 376' in which the inlet of the load compressor 21 is received. The two plenums 372', 376' can be configured as separately formed elements detachably interconnected, or alternately, be permanently and/or integrally connected Although the filter 382 is shown as a planar filter, it is understood that the filter 382 may have any other suitable configuration including, but not limited to, the filter 182 of FIGS. 3-5.

The above description is meant to be exemplary only, and one skilled in the art will recognize that changes may be made to the embodiments described without departing from the scope of the invention disclosed. For example, elements of any of the described embodiments can be combined. Still other modifications which fall within the scope of the present invention will be apparent to those skilled in the art, in light of a review of this disclosure, and such modifications are intended to fall within the appended claims.

The invention claimed is:

1. A movable inlet assembly for an auxiliary power unit for an aircraft, the assembly comprising:
a first inlet defined on an exterior skin of the aircraft, the first inlet fluidly communicating between an environment of the aircraft and an engine of the auxiliary power unit via a particle separator when the inlet assembly is in a first configuration;
a second inlet defined on an exterior skin of the aircraft, the second inlet fluidly communicating between the environment of the aircraft and the engine independently of the particle separator when the inlet assembly is in a second configuration;
a member selectively positionable to substantially block communication between the second inlet and the engine when the inlet assembly is in the first configuration.

2. The assembly as defined in claim 1, wherein the first inlet also fluidly communicates with a compartment containing the auxiliary power unit via the particle separator in the first configuration, and the second inlet also fluidly communicates with the compartment independently of the particle separator in the second configuration.

3. The assembly as defined in claim 1, wherein the first inlet communicates with the engine through a plenum in the first configuration, and the second inlet communicates with the engine through the plenum in the second configuration.

4. The assembly as defined in claim 1, wherein the first inlet is selectively closable by a first door and the second inlet is selectively closable by a second door, and wherein:
in the first configuration, the first door is closed and the second door is open; and
in the second configuration, the first door is open and the second door is closed.

5. The assembly as defined in claim 1, wherein the first and second inlets communicate with the engine through a filter.

6. The assembly as defined in claim 1, wherein the first inlet also fluidly communicates with a compressor of the auxiliary power unit via the particle separator in the first configuration, and the second inlet also fluidly communicates with the compressor independently of the particle separator in the second configuration.

7. The assembly as defined in claim 1, wherein the particle separator includes a plurality of vortex tubes.

8. An auxiliary power unit assembly for an aircraft, comprising:
an internal combustion engine received in a compartment;
a particle separator configured to remove particles from a flow;
an inlet assembly including:
a first inlet fluidly communicating between an environment of the aircraft and the internal combustion engine via a particle separator when the inlet assembly is in a first configuration and fluidly communicating between the environment and the compartment via the particle separator when the inlet assembly is in the first configuration;
a second inlet fluidly communicating between the environment and the engine independently of the particle separator when the inlet assembly is in a second configuration and fluidly communicating between the environment and the compartment when the inlet assembly is in the second configuration;
a member selectively positionable to substantially block communication between the second inlet and the engine when the inlet assembly is in the first configuration;

wherein the first and second inlets communicate with the internal combustion engine through a filter and with the compartment independently of the filter.

9. The assembly as defined in claim 8, wherein the first inlet communicates with the engine through a plenum in the first configuration, and the second inlet communicates with the engine through the plenum in the second configuration.

10. The assembly as defined in claim 8, wherein the first inlet is selectively closable by a first door and the second inlet is selectively closable by a second door, and wherein:
   in the first configuration, the first door is closed and the second door is open; and
   in the second configuration, the first door is open and the second door is closed.

11. The assembly as defined in claim 8, further comprising a heat exchanger in heat exchange relationship with a coolant of the internal combustion engine, the heat exchanger being in fluid communication with the compartment.

12. The assembly as defined in claim 8, wherein the internal combustion engine is a Wankel rotary engine including a rotor having three apex portions mounted for eccentric revolutions within an internal cavity defined in a housing, the internal cavity having an epitrochoid shape with two lobes.

13. The inlet assembly as defined in claim 8, further comprising a compressor drivable by the internal combustion engine, and wherein the first inlet also fluidly communicates with the compressor via the particle separator in the first configuration, and the second inlet also fluidly communicates with the compressor independently of the particle separator in the second configuration.

14. The inlet assembly as defined in claim 8, wherein the particle separator includes a plurality of vortex tubes.

15. The inlet assembly as defined in claim 8, wherein the first and second inlets are in fluid communication with the internal combustion engine through a compressor.

16. A method of feeding air to an auxiliary power unit assembly of an aircraft, the method comprising:
   in a contaminated environment, circulating air from the environment of the aircraft via a first inlet on an exterior skin of the aircraft into a plenum through a particle separator to remove particles from the air;
   in a clean environment, circulating air from the environment of the aircraft via a second inlet on the exterior skin into the plenum at least in part without circulating through the particle separator; and
   in the contaminated and clean environments, circulating a first portion of the air from the plenum to an inlet of an internal combustion engine of the auxiliary power unit assembly through a filter and a second portion of the air from the plenum to a compartment containing the internal combustion engine independently of the filter;
   wherein, in the contaminated environment, the method further comprises positioning a door in a closed position to substantially block communication between the second inlet and the internal combustion engine.

17. The method as defined in claim 16, wherein the plenum is a first plenum, and wherein in the contaminated environment, the air is circulated through the particle separator into a second plenum, and from the second plenum into the first plenum.

18. The method as defined in claim 16, further comprising, in the contaminated and clean environments, circulating a third portion of the air from the plenum to an inlet of a compressor of the auxiliary power unit assembly.

19. The method as defined in claim 16, wherein the internal combustion engine is a Wankel rotary engine including a rotor having three apex portions mounted for eccentric revolutions within an internal cavity defined in a housing, the internal cavity having an epitrochoid shape with two lobes.

* * * * *